US011485912B2

(12) United States Patent
Spencer et al.

(10) Patent No.: US 11,485,912 B2
(45) Date of Patent: Nov. 1, 2022

(54) DISPOSAL OF REFUSE

(71) Applicant: Manik Ventures Limited, Evesham (GB)

(72) Inventors: Nik Spencer, Abbots Morton (GB); Matthew Gibbon, Evesham (GB); Hussam Jouhara, Manchester (GB)

(73) Assignee: MANIK VENTURES LIMITED, Evesham (GB)

( * ) Notice: Subject to any disclaimer, the term of this patent is extended or adjusted under 35 U.S.C. 154(b) by 663 days.

(21) Appl. No.: 15/110,609

(22) PCT Filed: Jan. 9, 2015

(86) PCT No.: PCT/EP2015/050369
§ 371 (c)(1),
(2) Date: Jul. 8, 2016

(87) PCT Pub. No.: WO2015/104400
PCT Pub. Date: Jul. 16, 2015

(65) Prior Publication Data
US 2016/0326440 A1     Nov. 10, 2016

(30) Foreign Application Priority Data

Jan. 10, 2014 (GB) ...................................... 1400422
Jan. 17, 2014 (GB) ...................................... 1400834
Mar. 4, 2014 (GB) ...................................... 1403814

(51) Int. Cl.
*C10B 53/07* (2006.01)
*C10B 47/04* (2006.01)
(Continued)

(52) U.S. Cl.
CPC ................ *C10B 53/07* (2013.01); *B09B 3/40* (2022.01); *B09B 5/00* (2013.01); *C10B 19/00* (2013.01);
(Continued)

(58) Field of Classification Search
CPC ......... B09B 3/0083; B09B 5/00; C10B 47/04; C10B 53/00; C10B 19/00; C10B 53/07;
(Continued)

(56) References Cited

U.S. PATENT DOCUMENTS 5,634,414 A    6/1997 Camacho
7,017,347 B1   3/2006 Pierce
(Continued)

FOREIGN PATENT DOCUMENTS

CN    101306796 A    11/2008
CN    102644923 S    8/2012
(Continued)

OTHER PUBLICATIONS

Emis, Flemish Knowledge Centre for Best Available Techniques, "Pyrolysis," Feb. 20, 2010, accessed on the Internet at https://emis.vito.be/en/bat/tools-overview/sheets/pyrolysis on Jul. 3, 2021, 10 pages. (Year: 2010).*

(Continued)

*Primary Examiner* — Jonathan M Peo
(74) *Attorney, Agent, or Firm* — Westman, Champlin & Koehler, P.A.; Z. Peter Sawicki; Amanda M. Prose

(57) ABSTRACT

Existing approaches to refuse handling are all based on historical approaches which rely on a network of refuse collection vehicles collecting waste from individual households and delivering this to a centralised landfill or MBI location. This is highly undesirable and wasteful. An alternative process is disclosed, relying on the thermal treatment of waste and like products produced or brought in to the residential property and processed within the domestic curtilage to produce fuel or other forms of energy. Thus, domestic waste will be thermally treated at the home instead of being collected by local authorities and disposed of. The waste input put material will be loaded into a domestically (Continued)

engineered thermal conversion unit either directly or after a pre-process such as shredding. The feedstock will be converted into fuels by a thermal treatment, such as pyrolysis. The resultant output of oil and gas can either be stored or fed into a boiler unit to be used as a fuel to produce hot water, or used to run an electricity generating unit to power the dwelling in question or for supply to a feed-in tariff. Thus, a domestic dwelling includes a thermal treatment unit for processing waste produced in the dwelling, an output of the thermal treatment unit being combusted for producing an energy output for the dwelling. A suitable pyrolysis chamber is disclosed.

11 Claims, 4 Drawing Sheets

(51) Int. Cl.

| | | |
|---|---|---|
| B09B 5/00 | (2006.01) | |
| C10J 3/00 | (2006.01) | |
| C10B 53/00 | (2006.01) | |
| F23G 5/08 | (2006.01) | |
| F23G 5/027 | (2006.01) | |
| F23G 5/46 | (2006.01) | |
| F23G 5/033 | (2006.01) | |
| F24D 7/00 | (2022.01) | |
| F24D 3/08 | (2006.01) | |
| F24D 15/00 | (2022.01) | |
| B09B 3/40 | (2022.01) | |
| C10B 19/00 | (2006.01) | |
| C10G 1/02 | (2006.01) | |

(52) U.S. Cl.
CPC .............. *C10B 47/04* (2013.01); *C10B 53/00* (2013.01); *C10G 1/02* (2013.01); *C10J 3/005* (2013.01); *F23G 5/027* (2013.01); *F23G 5/0276* (2013.01); *F23G 5/033* (2013.01); *F23G 5/085* (2013.01); *F23G 5/46* (2013.01); *F24D 3/08* (2013.01); *F24D 7/00* (2013.01); *F24D 15/00* (2013.01); *F23G 2201/303* (2013.01); *F23G 2201/80* (2013.01); *F23G 2204/201* (2013.01); *F23G 2206/203* (2013.01); *F24H 2240/00* (2013.01); *Y02E 20/12* (2013.01)

(58) Field of Classification Search
CPC ........ F23G 5/0276; F23G 5/033; F23G 5/085; F23G 5/46; F23G 2201/303; F23G 2201/80; F23G 2204/201; F23G 2206/203; F23G 5/027; F24D 3/08; F24D 7/00; F24D 15/00; Y02E 20/12; F24H 2240/00; C10J 3/005; C10G 1/02
See application file for complete search history.

(56) References Cited

U.S. PATENT DOCUMENTS

| | | | |
|---|---|---|---|
| 2005/0183642 A1* | 8/2005 | Basic, Sr. | ............... F23G 5/444 110/224 |
| 2007/0099039 A1 | 5/2007 | Galloway | |
| 2008/0149471 A1* | 6/2008 | Wolfe | ...................... C10B 47/44 201/8 |
| 2009/0071382 A1* | 3/2009 | Clarke | ..................... F23J 15/04 110/346 |
| 2010/0092652 A1* | 4/2010 | Ogura | ....................... C05F 9/02 71/14 |
| 2011/0045418 A1* | 2/2011 | Russell | ................. F23D 11/001 431/6 |
| 2020/0158334 A1* | 5/2020 | Spencer | .................... F23G 5/46 |

FOREIGN PATENT DOCUMENTS

| | | | | |
|---|---|---|---|---|
| JP | H11152479 A | * | 6/1999 | .......... Y02W 30/703 |
| JP | 2000157949 A | * | 6/2000 | ............... B09B 3/00 |
| JP | 2006019259 A | | 1/2006 | |
| JP | 2006026539 A | * | 2/2006 | .......... Y02A 40/201 |
| JP | 2007075807 A | * | 3/2007 | .............. Y02E 50/30 |
| JP | 2009529421 A | * | 8/2009 | ............... F23G 5/40 |
| KR | 100583892 B1 | * | 5/2006 | ............... B09B 3/00 |
| RU | 2258870 C2 | | 8/2005 | |
| WO | 03012007 A1 | | 2/2003 | |
| WO | WO-2007104954 A2 | * | 9/2007 | ............... F23G 5/40 |
| WO | WO2008058137 A2 | * | 5/2008 | .......... B01D 5/0006 |
| WO | 2010065137 A1 | | 6/2010 | |

OTHER PUBLICATIONS

Merriam-Webster, Merriam-Webster Dictionary, definition of "lid," accessed on the Internet at https://www.merriam-webster.com/dictionary/lid, on Jul. 7, 2021, 1 page. (Year: 2021).*

Merriam-Webster Dictionary, "Define," Merriam-Webster.com Dictionary, Merriam-Webster, accessed on the Internet at https://www.merriam-webster.com/dictionary/define, on Mar. 6, 2022 (Year: 2022).*

"Reinvent the toilet challenge" Delft University of Technology, Jun. 17, 2014, see http://vimeo.com/channels/rttcdelft, available since Jun. 2013.

Search Report and Written Opinion issued in related International Patent Application No. PCT/EP2015/050369 dated Mar. 11, 2015.

Search Report issued in related GB patent application No. 1400422.0, dated Jun. 18, 2014.

* cited by examiner

DISPOSAL OF REFUSE

CROSS-REFERENCE TO RELATED APPLICATION

This application is a Section 371 National Stage Application of International Application No. PCT/EP2015/050369, filed Jan. 9, 2015, and published as WO2015/104400A1 on Jul. 16, 2015, which claims priority to and benefits of GB Patent Application Serial No. 1400422.0 filed Jan. 10, 2014, and GB Patent Application Serial No. 1400834.6, filed Jan. 17, 2014, and GB Patent Application Serial No. 1403814.5, filed Mar. 4, 2014, the entire contents of which are incorporated herein by reference.

FIELD OF THE INVENTION

The present invention relates to the disposal of refuse, especially refuse from domestic dwellings and smaller commercial establishments.

BACKGROUND ART

The domestic households of the United Kingdom collectively generate approximately 30 million tonnes of waste per year. Typically, 40% of this is recyclable—such as paper, cardboard, glass, cans plastics and (in some cases) green waste and food waste. This waste is collected from the majority of households via a kerbside type collection scheme operated by or on behalf of local government bodies. Existing UK practice is to require householders to divide waste into separate containers for the various types of recyclable waste, to allow these to be harvested with the remainder being classed as residual waste. The waste is collected either weekly or fortnightly, and the residual waste is either landfilled or sent to large scale Energy from Waste plants to generate electricity.

The current approach is that waste is collected in Refuse Collection Vehicles (RCV) and disposed of through large-scale Energy from Waste (EfW) incinerators or Mass Burn Incinerators (MBI). These can process circa 200k to 300k tonnes of waste per annum. These MBIs use existing proven technology which makes them attractive to the financial markets to fund the capital cost of the plant when combined with long term waste disposal contracts with the County Councils who are responsible for the disposal and treatment of waste generated by their residents.

On the fringes there are alternative thermal treatment technologies emerging, such as gasification, pyrolysis and plasma, which effectively break down the waste to a synthesised gas (Syngas) and fuel product. The gas and oil can then be utilised to run electrical generating equipment. These technologies are still in their relative infancy but do have substantial environmental benefits; they are cleaner than the conventional incinerators and although smaller than MBIs their capacity is still substantial, circa 15k to 30k tonnes per annum. However, it is not yet clear that these units will be able to scale their capacity up to a commercially viable size.

US 2007/0099039A1 discloses an appliance for converting household waste into energy, in which syngas is used to power a fuel cell for the generation of electric power, steam and heat or cooling for use in residences and buildings. A waste conversion reactor that applies a steam reforming process to the waste is heated with a combination of waste heat and electrical power or a natural gas burner. To our knowledge, this steam reforming process has not been shown to be practically usable, especially in a domestic context.

SUMMARY OF THE INVENTION

The currently-viable approaches to refuse handling are all based on historical approaches which rely on a network of RCVs collecting waste from individual households and delivering this to a centralised landfill or MBI location. This is highly undesirable and wasteful. A substantial investment needs to be made in a fleet of RCVs, which also incurs significant running costs. The process of operating these vehicles introduces a range of health & safety issues; injuries can result from the lifting, moving and handling work that is required, and road traffic incidents arise through placing operatives in the roadway around both routine traffic and the RCV itself. A location needs to be found for the landfill or MBI, which needs to comply with local planning or zoning laws and which usually meets with resistance from nearby residents. To obtain an acceptable site for the landfill or MBI, a remote location with few immediate neighbours is usually needed, thereby increasing the running costs and associated emissions of the RCV fleet. These historic approaches also assume that there is a ready market for recyclable materials, which has previously been provided by demand from Asian countries. However, as those countries become more self-sufficient in collecting and processing their own recyclable waste, this market is declining.

The present invention therefore proposes the thermal treatment of waste and like products produced or brought in to the residential property and processed within the domestic curtilage to produce fuel or other forms of energy. Thus, domestic waste will be thermally treated at the home instead of being collected by local authorities and disposed of.

The waste input material will be loaded into a domestically engineered thermal conversion unit either directly or after a pre-process such as shredding. The feedstock will be converted into fuels by a thermal treatment, such as pyrolysis. The resultant output of oil and gas can either be stored, or fed into a boiler unit (or combusted in situ) to be used as a fuel to produce hot water, or used to run an electricity generating unit to power the dwelling in question. It can also be used as a fuel to assist in obtaining the temperatures needed for the pyrolysis process, thereby reducing the energy demands of the unit. Some or all of the electricity generated, or of the oil and/or gas output, could be exported for supply to a feed-in tariff, for use elsewhere.

In one aspect, the present invention therefore proposes a domestic dwelling including a thermal treatment unit for processing waste produced in the dwelling, an output of the thermal treatment unit being combusted for producing an energy output for the dwelling. The output of the thermal treatment unit can include syngas (synthesis gas) and/or oil; this can be combusted in situ or fed to a separate combustor. One advantage of a separate combustor is that it can be adapted to receive a second fuel in addition to the combustible output, for example in order to allow continuity of fuel supply regardless of the amount of waste being processed. The combustor will often be a furnace (or boiler as referred to in the UK) connected to pipework installed within the dwelling for heating water circulating within the pipework. That water can be used to heat radiators and/or a hot water supply for the dwelling. Alternatively, the combustor may be an electrical generator or a combined heat and power unit.

The output of the thermal treatment unit often includes a residue, so the thermal treatment unit can have a connection to a sewerage system to allow disposal thereof.

In another aspect, the present invention provides a pyrolysis chamber for treating domestic refuse, comprising a receptacle for the refuse, the receptacle being defined by a double-skinned enclosure having an exterior wall, an interior heat-conductive wall, and a void between the two walls in which a working fluid is disposed, and at least one heating element in thermal contact with the enclosure.

The double-skinned arrangement with a working fluid within the void creates a chamber with a very uniform temperature distribution, which assists the pyrolysis process. The enclosure preferably also includes at least one heat-conductive pin extending from the interior wall into the interior of the receptacle, to create a more uniform temperature distribution within the interior of the chamber and especially within the interior of the initially-cold refuse placed within the chamber. The at least one pin is preferably hollow, and the hollow interior of the pin is ideally in fluid communication with the void in order to share the heat-transmitting capabilities of the fluid.

The receptacle preferably also includes at least one leg extending from the exterior wall, and a heat source connected to the leg in order to introduce heat into the chamber and elevate the temperature to a level sufficient for pyrolysis. The at least one leg is ideally hollow, with the hollow interior of the leg being being in fluid communication with the void in order to provide a high degree of thermal communication with the remainder of the chamber. The heat source can be an electrical heating element, or a heat exchanger, which may be supplied with waste heat recovered from the current or previous pyrolysis cycles. Multiple such legs may be provided, each with a heat source. A range of different heat sources may be provided on different legs.

The enclosure is preferably formed of stainless steel in order to provide the necessary thermal, mechanical and corrosion properties.

The working fluid need not completely fill the void; an expansion gap may be provided which can be evacuated, or filled with an inert gas, or filled with air. The working fluid can be Dowtherm A™ or (liquid) sodium; generally Dowtherm A™ is preferred for temperatures up to about 400° C. whereas sodium is preferable above this level.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
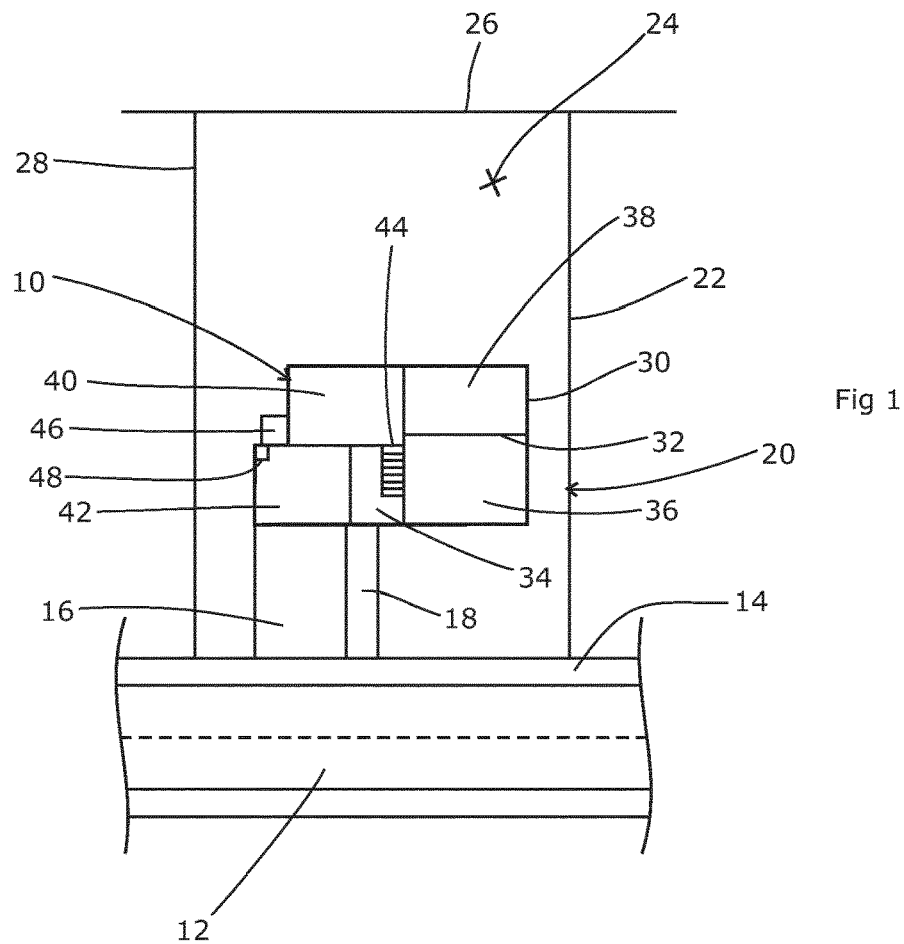
FIG. 1 shows a typical domestic dwelling in which the present invention has been installed.

The current systems of domestic refuse collection and disposal still rely on one common thread—that waste needs to be collected from every household. Collecting waste is expensive, not only in terms of the immediate costs of collection, disposal and/or processing, but also in terms of national or regional environmental taxes relating to dispose of waste; in the United Kingdom this amounts to approximately £90 per tonne. The industry trend is in making improvements in the handling of the waste after it has been collected and taken to a processing site—improvements such as better sorting of the waste to increase recycling rates, and/or alternative disposal methods such as mass-burn incinerators (MBIs) and thermal treatment methods including pyrolysis and plasma treatment. However, MBIs are expensive, and the emerging thermal technologies have not been demonstrated to be capable of being scaled up to an economically viable capacity.

According to the present invention, such thermal technologies are scaled down, instead of up. Instead of a large unit at a processing site to which the refuse must be transported, the invention provides a domestic unit, located at the house, to process the waste produced in that house. Waste is put into a domestic thermal treatment unit, ideally about the size of a white-goods appliance, which would process the waste and generate waste oil and syngas. The oil and syngas could then fuel a domestic boiler, probably supplemented by a natural gas supply in order to ensure a stable supply. Alternatively, or in addition, the oil and gas could be used to run a small-scale electricity generating unit to produce electrical power. This could then be stored via batteries and used when required, or fed into the household power mains, or fed into the local electrical grid via a feed-in tariff. So-called "micro combined heat and power" are available for domestic use and produce a combination of heat for the dwelling and an electrical power output. The combination of energy generated from waste and solar technology to generate electricity during the day, along with new efficient building design, could make houses self-sufficient in time. The thermal treatment unit will also provide a direct heat output which can be piped throughout the house as a process by-product, or integrated into the heating capability of the boiler, or used to drive an electrical generation unit directly.

A small-scale unit of this type could use one or more of plasma, pyrolysis and cracking type technologies, although we believe pyrolysis to be the most practical. These take a mixed homogeneous material stream and use thermal and pressure based processes to reduce the waste composition back to 3 component parts—oil, gas and carbon. Pyrolysis technologies that are currently available use heat in the absence of air to decompose the molecular composition of the material. Plasma gasification is a process which converts organic matter into synthetic gas, electricity, and a solid residue using plasma. A plasma torch powered by an electric arc is used to ionize gas and catalyse the conversion of organic matter into synthetic gas and solid waste.

The waste can be shredded in order to make it more suitable for processing in the unit. A receptacle for the waste, either before or after a shredder, will help smooth the flow of waste into the unit.

FIG. 1 shows a domestic dwelling-house 10 in which the system is installed. A roadway 12 has a pavement (or sidewalk) 14 over which access can be gained to a driveway 16 in front of the house 10. A walkway 18 alongside the driveway 16 allows access to a front door at the front of the house 10. A perimeter fence 20 extends along one side 22 of the property 24 in which the house 10 is located, then along the rear boundary 26, and along the opposite side boundary 28 as far as the pavement 14. Together with the pavement 14, the perimeter fence 20 provides a visible definition to the boundary of the property 24.

The house 10 itself has an external wall 30 and internal walls 32 defining individual rooms within the house, including a hallway 34 into which the front door opens, a sitting room 36, a dining room 38, a kitchen 40, and a garage 42 which opens onto the driveway 16. Stairs 44 lead upwards from the hallway 34 to an upper floor with bedrooms and one or more bathrooms. The house may of course be arranged differently and have more or fewer rooms.

Figure 2:
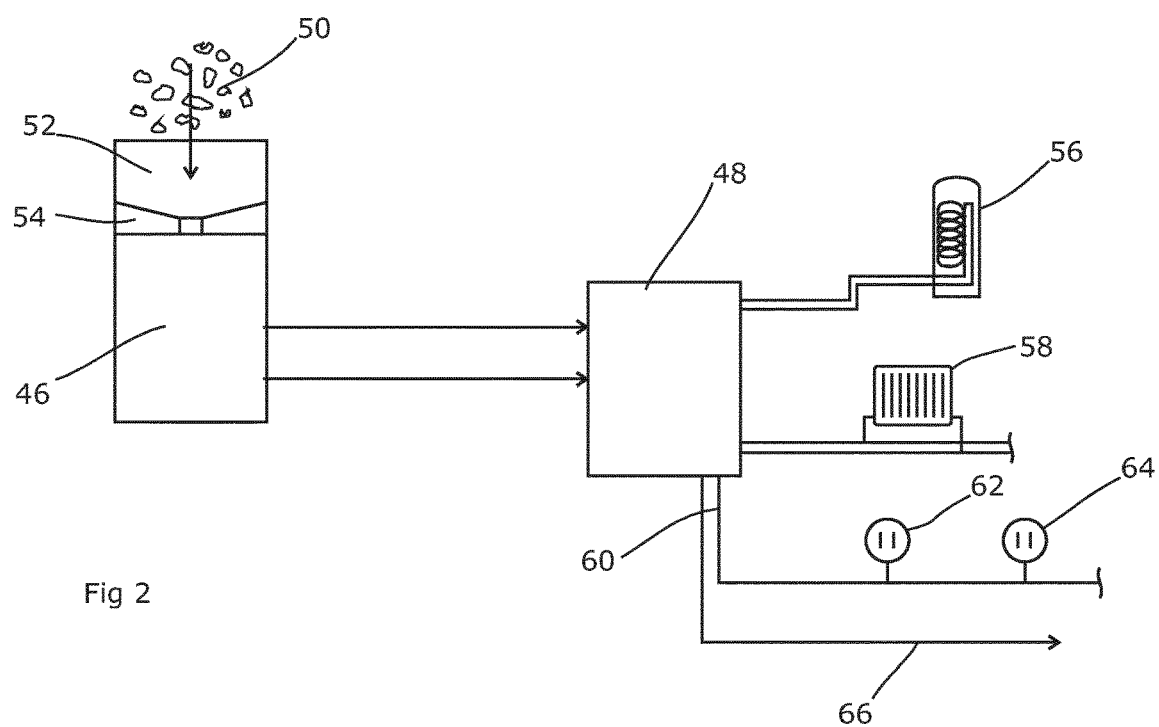
FIG. 2 shows a system schematic according to the present invention.
Figure 3:
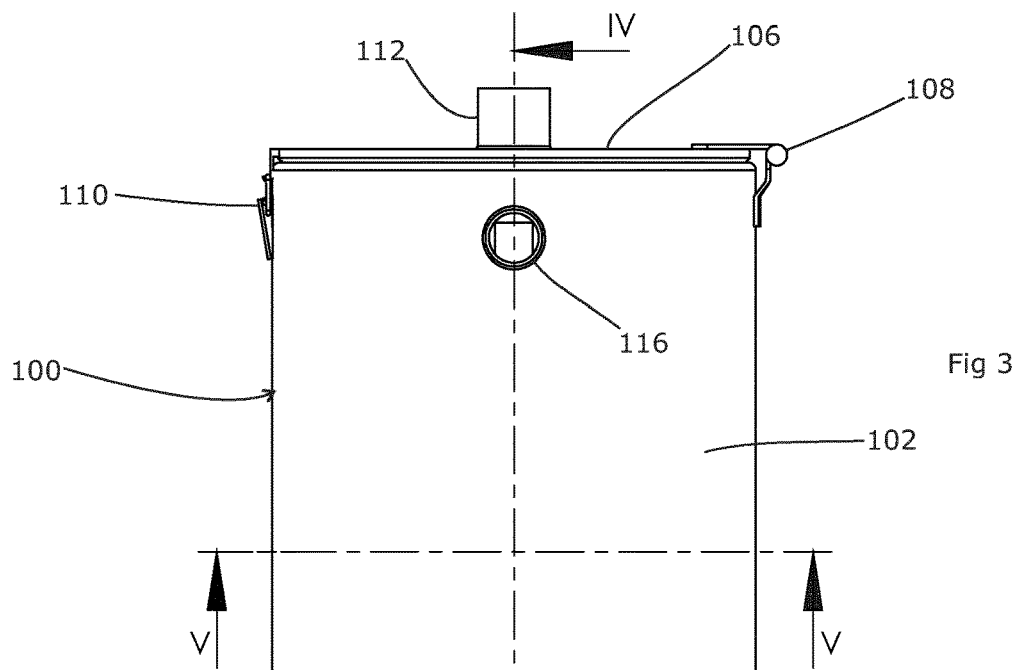
FIG. 3 shows a side view of a pyrolysis chamber according to the present invention.
Figure 4:
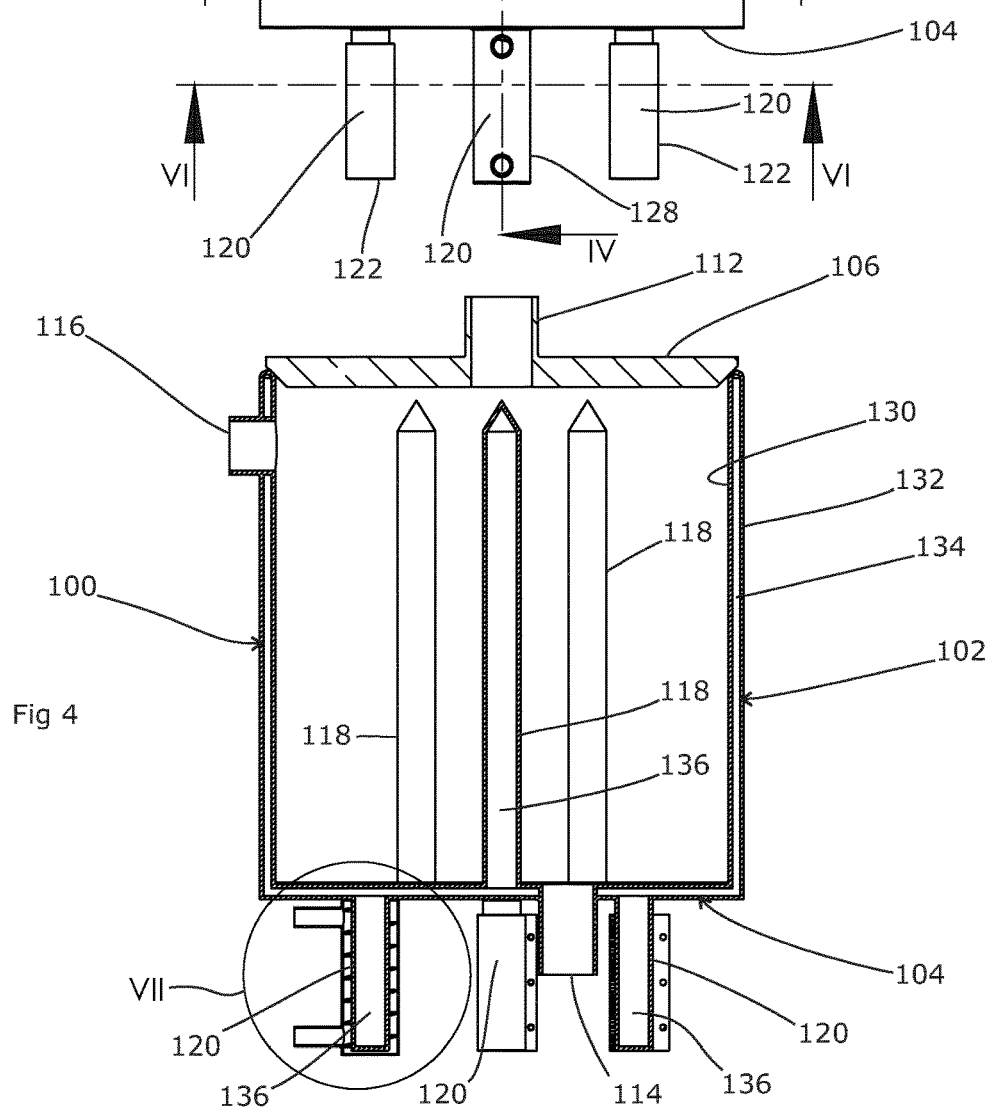
FIG. 4 shows a vertical section through FIG. 3, on line IV-IV.
Figure 5:
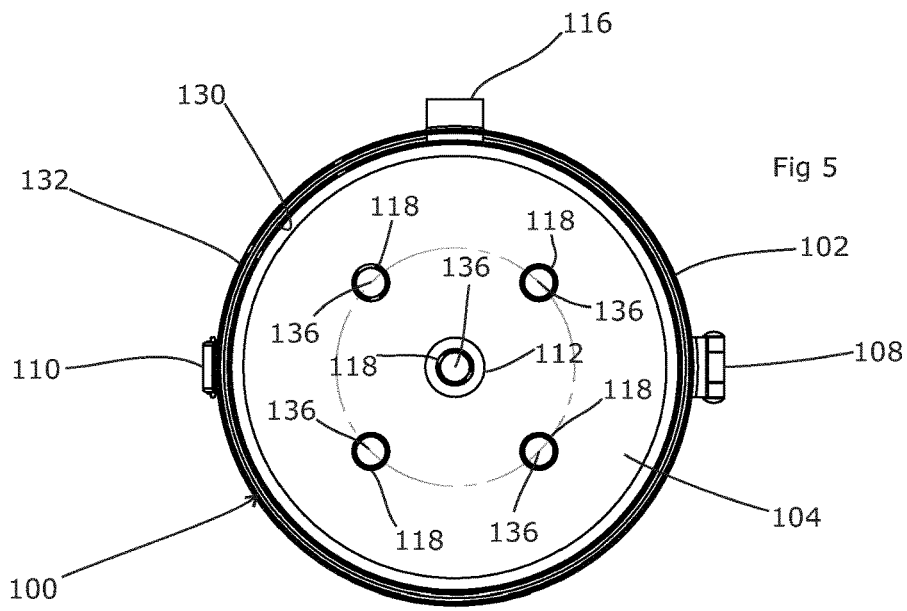
FIG. 5 shows a horizontal section through FIG. 3, on line V-V.
Figure 6:
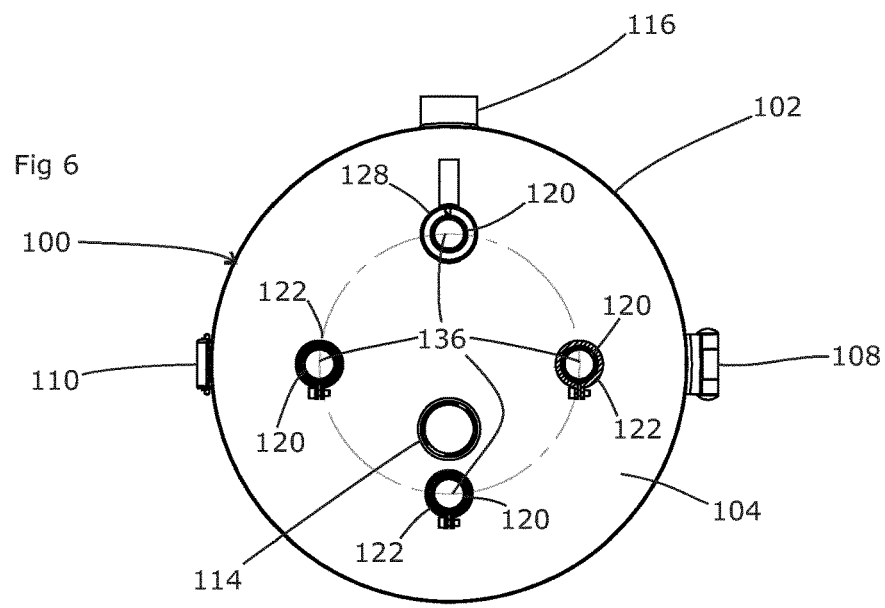
FIG. 6 shows a horizontal section through FIG. 3, on line VI-VI.
Figure 7:
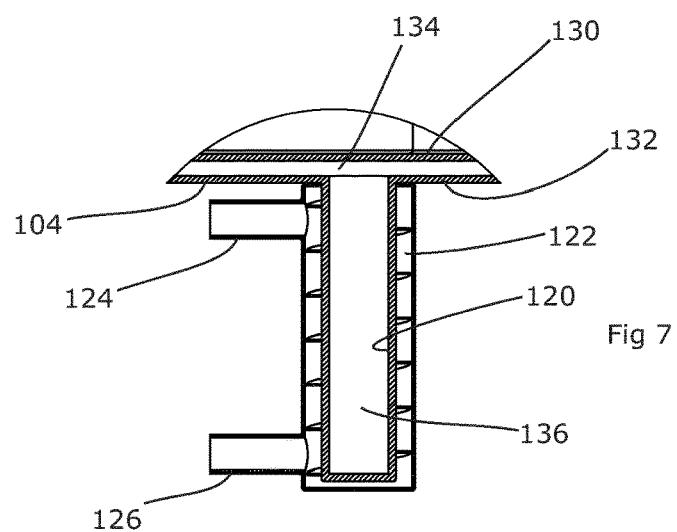
FIG. 7 shows an enlarged version of region VII on FIG. 4.

A thermal treatment unit 46 is located adjacent the house 10, against the external wall 30. It is located near to the kitchen 40 where most of the waste is produced, for the convenience of the householder. As noted above, the thermal treatment unit 46 produces an output that is a combination of syngas and combustible oils, these are fed to a boiler 48 which (in this case) is in the conventional location within the garage 42. The boiler supplements the output of the thermal treatment unit 46 when necessary with a natural gas supply, and burns these fuels in order to generate heat for the house 10 in a conventional manner. This is shown in FIG. 2; waste 50 is placed in a receptacle 52 in the thermal treatment unit 46, and passes through a shredder 54 before being treated. The output of the treatment unit 46 is then fed to the boiler 48 and is used to heat a working fluid (usually water) that is circulated around one or more heating circuits. The circuit may include a hot water tank 56 containing water that is then heated for use within the house 10, and/or a number of radiators 58 for warming the house 10.

The boiler 48 may be in the form of a micro-combined-heat-and-power unit, and thus may also have an electrical output 60 leading (eventually) to one or more electrical outlets 62, 64 within the house. The or another electrical output 66 may also lead to a connector for a feed-in tariff, in which locally generated power is fed into the wider electrical grid.

Of course, the thermal treatment unit 46 and the boiler 48 may be integrated into a single unit that accepts waste 50 and (in all likelihood) an alternative power source (such as a natural gas supply), and creates heat and/or power for the house 10. Likewise, the unit or units may be located differently within (or outside) the house.

Pyrolysis units typically leave a residue of carbonised material, usually as a light ash. This is inert, and can thus be flushed away via a sewerage system. The thermal treatment unit 46 therefore has (in preferred arrangements) a connection to the household water supply and sewerage system for this purpose. An alternative is to drop the residue into a container for routine disposal by the householder.

This gives rise to a wide range of benefits. Fewer waste collections are needed, resulting in savings in the waste infrastructure and landfill usage, and reductions in the greenhouse gas emissions from landfill sites. The emissions from refuse collection vehicles will also be reduced, as will the fossil fuels used by them, leading to reduced operating costs for local authorities and the potential for reductions in local taxes. At the same time, once the initial capital costs have been covered, energy bills for the households in question will be reduced corresponding to the heat and/or electrical power produced by the unit. Fossil fuel usage by households and by the power generation facilities that supply them will also reduce.

FIGS. 3 to 7 illustrate a suitable pyrolysis chamber for use in the present invention. Thus, a generally cylindrical vessel 100 has circular side walls 102 and an integral base section 104. An open upper end is closeable during use by way of a lid 106, held in place via a hinge 108 on one side and a latch mechanism 110 opposite, to allow the lid to seal hermetically to the vessel 100. An inlet 112 is formed in the lid 106 to allow water for cooling and washing to be introduced, and a corresponding outlet 114 is provided on the base 104 of the vessel 100. If preferred, the inlet 112 could be provided elsewhere, such as on a side wall of the vessel 100. An exhaust port 116 is formed on the side of the vessel 100 to allow for extraction of the pyrolysis results, as will be explained below.

Within the vessel 100, there are five spikes 118 extending upwardly from the base 104, arranged in a square formation with four spikes at the corners of the square and one at the centre, the square being centred on the central axis of the cylindrical vessel. The diagonal of the square is approximately half the diameter of the cylindrical vessel 100, thus distributing the spikes 118 evenly around the interior of the vessel 100. The exhaust port 116 faces a side of the square, thereby minimising the effect of the spikes 118 on flow through the exhaust port 116. These spikes 118 fit between and into refuse that has been loaded into the vessel 100 and serve to introduce heat from the vessel surfaces into the bulk of the refuse, thus assisting with the pyrolysis process. More or fewer spikes could be provided as desired, with a greater number of spikes providing more effective heat transfer and a lesser number making loading of refuse into the vessel 100 easier. A narrower vessel 100 may require fewer spikes 118 in order to ensure temperatures adequate for pyrolysis at the middle of the vessel; indeed, it may be possible to omit the spikes 118 entirely. Likewise, the spikes 118 could be arranged differently, although symmetrical arrangements are to be preferred.

Four legs 120 extend from the exterior of the base 104; these are again arranged in a square pattern centred on the central axis of the cylindrical vessel, with each leg at a corner of the square and the diagonal of the square being approximately half the diameter of the cylindrical vessel 100. The square pattern of the legs 120 is however rotated 45° relative to the square pattern of the spikes 118; as a result the legs 120 and the spikes 118 are not directly aligned. Each leg has an associated heat source; for three legs the heat source is an electrical heater 122 with contacts 124, 126 through which electrical power is supplied in order to heat the leg. The fourth leg is provided with a heat exchanger 128 which will be described further below.

The walls of the vessel 100 are formed in a double-skinned arrangement, including a thermally-conductive inner wall 130 and an outer wall 132. The outer wall 132 is ideally also thermally conductive; indeed as illustrated in FIGS. 3 to 7 it is an integral structure with the inner wall 130. A high-grade stainless steel is suitable for the wall material as it is sufficiently rigid and thermally conductive, while offering resistance to corrosion due to the potentially harsh environment that may be created within the chamber 100 during pyrolysis. The outlet 114 and the exhaust port 116 extend from the inner wall 130, through the void 134 between the two walls, and through the outer wall 132. The spikes 118 and the legs 120 extend from the inner wall 130 or the outer wall 132, respectively, and are themselves hollow with their hollow interior 136 communicating with the void 134.

Within the void 134, and thus also within the hollow interiors 136 of the spikes 118 and the legs 120, there is a small amount of heat transfer fluid (not shown).

The walls of the waste treatment chamber are thus formed by a hermetically-sealed, passive two phase heat transfer system, which is partially filled with a small amount of working fluid, present inside the chamber in two phases (liquid and vapour). The working fluid is substantially the only substance in the chamber's enclosure and is ideally saturated under all thermal conditions of the chamber. The superior thermal characteristics of the chamber make use of the highly efficient heat transfer processes of evaporation and condensation to maximize the thermal energy transfer between the heat legs 120 at the bottom and inner walls 130 of the chamber 100 that are in direct contact with the waste to be treated. The heat applied on the four legs of the chamber section is conducted across the leg's walls, causing the working fluid in the enclosure to boil. In this way the working fluid absorbs the applied heat load, storing it at least partly as latent heat. The vapour then flows to the (cooler) walls above the level of the legs 120, where it can condense and release the latent heat. The heat then conducts through the thin liquid film and the metal wall 130 and into the waste treatment chamber. Within the void 134, the flow circuit is completed by the liquid being forced by gravity back to the legs 120 in the form of a thin liquid film where it can be re-evaporated. The working fluid within the enclosure is at a substantially constant temperature (called the working temperature); thus when the vapour condenses on the inside walls of the chamber, it will keep these walls at the same temperature leading to the surfaces that will be in touch with the waste all being in a substantially single isothermal state.

The required working fluid volume will vary based on the thermal requirement, but is likely to be between 10% and 35% of the chamber's enclosure volume (i.e. the void 134 between the walls 130, 132 that form the chamber 100). Based on the required wall temperature of the chamber, the selection of the working fluid will be as follows:

a. Sodium or chamber wall temperatures between 400° C. and 700° C.

b. Dowtherm A™ for chamber wall temperatures between 300° C. and 400° C.

c. Water for chamber wall temperatures below 300° C.

The Dowtherm A heat transfer fluid is described by its manufacturer at http://www.dow.com/heattrans/products/synthetic/dowtherm.htm, and is a eutectic mixture of biphenyl ($C_{12}H_{10}$) and diphenyl oxide ($C_{12}H_{10}O$). The fluid also includes a dye to give it a clear to light yellow colour, but this is purely to aid in leak detection and although useful, is not essential to the invention. Dowtherm A fluid is described as being useful in systems employing either liquid phase or vapor phase heating, including indirect heat transfer. Generally, Dowtherm A will be sufficient for the temperatures usually required for pyrolysis processes, but if higher temperatures are required then liquid sodium can be used. Dowtherm A is to be preferred, however, as it does not present an explosion risk if the double walls of the chamber are breached.

The double-walled nature of the vessel 100 and the heat transfer fluid within the void 134 ensure that an even and high temperature can be achieved across the vessel 100. The spikes 118 extend that even temperature into the interior of the vessel 100 and accelerate the pyrolysis process significantly. The legs 120, with their hollow interiors that can accept the heat transfer fluid, are an especially efficient way to convey heat to the remainder of the vessel 100.

The chamber will ideally be located within a suitable enclosure, which will also house the various supporting ancillaries such as control systems for the heatingelements, etc.

Figure 8:
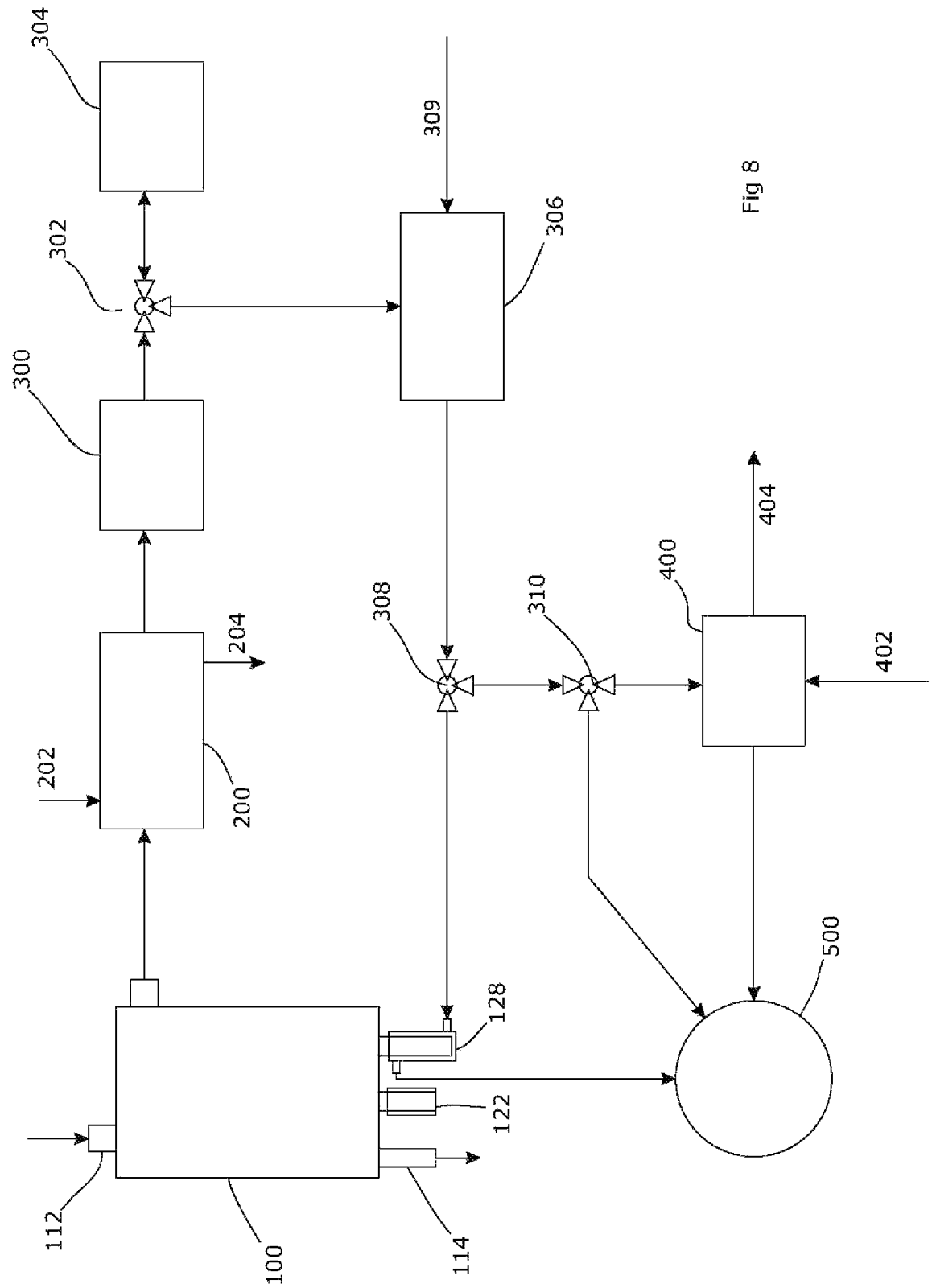
FIG. 8 is a process flowchart.

FIG. 8 shows a system diagram of the refuse treatment unit. The pyrolysis vessel 100 is opened via the lid 106 and pyrolisable refuse is placed inside. The lid 106 is closed and latched; oxygen is then removed from the vessel by either evacuation or displacement with an inert gas. The electrical heaters 122 are activated and the temperature within the vessel 100 is raised to a suitable temperature for pyrolysis, usually above about 170° C. As pyrolysis progresses, the chamber will yield water vapour and syngas via the exhaust port 116. This is passed to a multi-stage condensing and heat recovery unit 200, which essentially acts as a heat exchanger to heat water and/or air delivered via an inlet 202 and expelled via an outlet 204 to provide heated water and/or air for heating and/or sanitary use within the home or other building in which the unit is installed. As a result, the significant power requirements of the endothermic pyrolysis process is not wasted, but is re-used for other purposes thereby reducing the overall energy footprint of the device.

After heat recovery, the syngas and water mixture is further cooled, and thus separated by condensing of the water vapour, in a cooler 300. The syngas output of this cooler 300 is diverted via a valve 302 either to a storage tank 304 or to a combustion chamber 306 where the syngas can be burnt in a feed of air 309. Heat from the combusting syngas can then be supplied (using a suitable working fluid) to either the heat exchanger 128 on one or more legs 120 of the pyrolysis vessel 100 or to a waste heat recovery unit 400 via a valve 308. The waste heat recovery unit 400 also heats a domestic water or air supply 402 to produce a supply of hot water and/or air 404 for use in the same way as the hot water and/or air supply 402 above. The heat exchanger 128 and the waste heat recovery unit both vent any excess heat to a radiator 500 that releases the heat to the ambient environment; in addition, if necessary the heat output of the combustion chamber can be vented in the same way via a valve 310 prior to the waste heat recovery unti 400.

Thus, the pyrolysis chamber 100 requires a supply of refuse and heat; it outputs syngas, water vapour and heat. The output heat is recovered for domestic purposes, meaning that it may be preferable to store refuse in or near the pyrolysis unit until heating and/or hot water is needed. The syngas is extracted from the cooled output stream and can be stored until needed, or used immediately; once called upon it can be used to heat the building in question, or to contribute to the heat input called for by the vessel 100. In the latter case, the syngas can be stored for use in a later pyrolysis process, or may be used immediately in support of a later part of the current pyrolysis process.

Thus, the unit can be operated in a number of modes. Given that energy will be required to heat the building, that energy can be diverted to the pyrolysis process and then recovered to provide heating; together with the contribution from combusting syngas, this means that the net overall energy requirement of the unit could be very small. Alternatively, the unit could be driven substantially entirely via electrical heating, from which heat can be recovered in order to heat the building and syngas could be generated to further heat the building. Either way, the domestic refuse is disposed of, reducing or eliminating the need for a doorstep refuse collection (with the comcomitant environment benefits set out above), for little energy cost and/or with a benefit in the form of a heat supply for the building.

Once pyrolysis is complete, water can be injected into the vessel via the inlet 112 to cool the vessel 100 to a safe temperature and flush out solid residues via the outlet 114. These residues may be usable as biofuel, depending on the nature of the refuse that was initially put into the unit. Careful control of the working temperature of the waste treatment chamber should be sufficient to optimise the biofuel output.

It will of course be understood that many variations may be made to the above-described embodiment without departing from the scope of the present invention. For example, the thermal treatment unit, the shredder and/or the combustor could be adapted to utilise bio fuels. The combustor could be adapted to utilise natural gas or oil, and/or the electricity generating unit could be adapted to supplement its output derived from the combustor with electricity derived from wind, solar or geothermal energy sources. The domestic radiators referred to above could be any system which uses heated water to raise the temperature in a dwelling, such as underfloor heating. Other than heating the dwelling directly, the system could provide indirect heating, such as by using the electricity generated to operate a geothermal heating system via a heat pump. Furthermore, where different variations or alternative arrangements are described above, it should be understood that embodiments of the invention may incorporate such variations and/or alternatives in any suitable combination.

The invention claimed is:

1. A pyrolysis chamber for pyrolytically treating domestic refuse, comprising a receptacle having an interior for receiving the domestic refuse for treatment therein and a lid to allow the receptacle to be hermetically sealed with the domestic refuse for treatment inside, the receptacle being defined by a double-skinned enclosure having an interior heat-conductive wall within the interior of the receptacle and in contact with the domestic refuse and an exterior wall located further from the interior of the receptacle than the interior heat-conductive wall, with a hermetically-sealed void between the exterior wall and the interior heat-conductive wall, a working fluid being disposed within the hermetically-sealed void between the exterior wall and the interior heat-conductive wall thereby to define a passive two-phase heat transfer system in which the working fluid is retained within the double-skinned enclosure and does not contact the domestic refuse within the receptacle, at least one heating element being provided outside the receptacle, in thermal contact with the double-skinned enclosure and for heating the working fluid so that the working fluid evaporates, flows to the interior heat-conductive wall to condense, releases latent heat and transfers heat through the interior heat-conductive wall to pyrolise the domestic refuse within the receptacle.

2. The pyrolysis chamber according to claim 1 in which the double-skinned enclosure includes at least one heat-conductive spike extending from the interior heat-conductive wall into the interior of the receptacle.

3. The pyrolysis chamber according to claim 2 in which the at least one heat-conductive spike is hollow, and the hollow interior of the at least one heat-conductive spike is in fluid communication with the hermetically-sealed void.

4. The pyrolysis chamber according to claim 1 in which the receptacle includes at least one leg extending from the exterior wall, and a heat source connected to the at least one leg.

5. The pyrolysis chamber according to claim 4 in which the at least one leg is hollow, and the hollow interior of the at least one leg is in fluid communication with the hermetically-sealed void.

6. The pyrolysis chamber according to claim 4 in which the heat source is an electrical heating element.

7. The pyrolysis chamber according to claim 4 in which the heat source is a heat exchanger.

8. The pyrolysis chamber according to claim 1 in which the double-skinned enclosure is formed of stainless steel.

9. The pyrolysis chamber according to claim 1 in which the double-skinned enclosure containing the working fluid forms a hermetically-sealed, passive two phase heat transfer system.

10. The pyrolysis chamber according to claim 1 in which the working fluid is one of water, a eutectic mixture of biphenyl ($C_{12}H_{10}$) and diphenyl oxide ($C_{12}H_{10}O$) and Sodium.

11. The pyrolysis chamber according to claim 1 in which the pyrolysis chamber is configured for pyrolytically treating the domestic refuse in a batch process.

\* \* \* \* \*